(12) United States Patent
Panza et al.

(10) Patent No.: US 11,179,692 B2
(45) Date of Patent: Nov. 23, 2021

(54) MULTI-BED CATALYTIC CONVERTER WITH INTER-BED COOLING

(71) Applicant: CASALE SA, Lugano (CH)

(72) Inventors: Sergio Panza, Como (IT); Maddalena Lepri, Cavallasca (IT)

(73) Assignee: CASALE SA, Lugano (CH)

( * ) Notice: Subject to any disclaimer, the term of this patent is extended or adjusted under 35 U.S.C. 154(b) by 0 days.

(21) Appl. No.: 16/612,165

(22) PCT Filed: Feb. 21, 2018

(86) PCT No.: PCT/EP2018/054217
§ 371 (c)(1),
(2) Date: Nov. 8, 2019

(87) PCT Pub. No.: WO2018/206167
PCT Pub. Date: Nov. 15, 2018

(65) Prior Publication Data
US 2021/0077968 A1    Mar. 18, 2021

(30) Foreign Application Priority Data

May 11, 2017 (EP) .................... 17170546

(51) Int. Cl.
*B01J 8/00*    (2006.01)
*B01J 8/02*    (2006.01)
*B01J 8/04*    (2006.01)

(52) U.S. Cl.
CPC ........... *B01J 8/0415* (2013.01); *B01J 8/0496* (2013.01); *B01J 2208/0015* (2013.01); *B01J 2208/00212* (2013.01)

(58) Field of Classification Search
CPC ......... B01J 8/00; B01J 8/02; B01J 8/04; B01J 8/0403; B01J 8/0407; B01J 8/0415;
(Continued)

(56) References Cited

U.S. PATENT DOCUMENTS 6,631,757 B2 * 10/2003 Herzog ............... H01M 8/0631
165/167
2002/0018739 A1   2/2002 Johnston et al.
(Continued)

FOREIGN PATENT DOCUMENTS

EP          0376000 A1    7/1990
EP          2610001 A1    7/2013
WO       2017005399 A1    1/2017

OTHER PUBLICATIONS

International Preliminary Report on Patentability from International Application No. PCT/EP2018/054217 dated Aug. 28, 2019.
(Continued)

*Primary Examiner* — Natasha E Young
(74) *Attorney, Agent, or Firm* — Dorsey & Whitney LLP (57) ABSTRACT

A multi-bed catalytic converter comprising at least a first catalytic bed, a second catalytic bed and a heat exchanger arranged between said first bed and said second bed, wherein said heat exchanger is arranged to transfer heat from the hot effluent of the first bed to a cooling medium; said heat exchanger comprises a plurality of stacked round plates, wherein adjacent plates define gaps therebetween, and the effluent of the first catalytic bed and the cooling medium are respectively fed into alternate gaps.

24 Claims, 5 Drawing Sheets

(58) Field of Classification Search
CPC ............... B01J 8/0496; B01J 2208/00; B01J 2208/00008; B01J 2208/00017; B01J 2208/00106; B01J 2208/00115; B01J 2208/0015; B01J 2208/00168; B01J 2208/00212

See application file for complete search history.

(56) References Cited

U.S. PATENT DOCUMENTS

| | | |
|---|---|---|
| 2010/0310436 A1 | 12/2010 | Schellen et al. |
| 2013/0269906 A1 † | 10/2013 | Riendeau |
| 2014/0352935 A1 † | 12/2014 | Gruener |
| 2019/0185334 A1 † | 6/2019 | Gorval |

OTHER PUBLICATIONS

International Search Report from International Application No. PCT/EP2018/054217 dated May 9, 2018.

\* cited by examiner
† cited by third party

MULTI-BED CATALYTIC CONVERTER WITH INTER-BED COOLING

CROSS-REFERENCE TO RELATED APPLICATIONS

This application is a U.S. National Stage of PCT International Application No. PCT/EP2018/054217 filed on 21 Feb. 2018, which claims priority to European Patent Application No. 17170546.0 filed on 11 May 2017.

DESCRIPTION

Field of Application

The present invention relates to the field of multi-bed catalytic converters with inter-bed cooling.

Prior Art

Inter-cooled multi-bed catalytic converters are used in several fields, including e.g. the synthesis of methanol and the synthesis of ammonia.

An inter-cooled multi-bed converter comprises a plurality of catalytic beds arranged in series, and one or more inter-bed heat exchangers for cooling the gaseous flow of partially-reacted products passing from one bed to another.

According to a known multi-bed inter-cooled layout, the catalytic beds have an annular shape with a radial flow and the intercooling heat exchangers (ICHs) are arranged coaxially inside the annular beds. Such layout is described for example in EP 376 000 and EP 2 610 001.

The inter-bed coolers are typically shell-and-tube heat exchangers, with the cooling medium flowing in the tube-side and the gaseous flow flowing in the shell-side. The cooling medium may be the fresh charge of gaseous reactants, which is preheated at the expense of the heat recovered from the product cooling.

A disadvantage of the known converters with shell-and-tube heat exchangers is that design and construction become sophisticated and expensive with multiple catalytic beds. For example, each shell-and-tube heat exchanger needs a respective bundle of tubes with two tube sheets; tube sheets are quite expensive items and welding between tubes and the tube sheet require careful and expensive execution.

Another multi-bed inter-cooled layout is disclosed for example in US 2010/0310436, wherein the ICHs are plate heat exchangers. However, said layout provides for an inefficient heat exchange due to maldistribution of the reaction mixture and the cooling medium between the plates.

SUMMARY OF THE INVENTION

The purpose of the present invention is to provide a multi-bed catalytic converter overcoming the above mentioned drawbacks of the prior art. In greater detail, the purpose of the invention is to provide a multi-bed catalytic converter with inter-bed cooling, which is easy to realize and provides for an accurate control of the reaction temperature.

These aims are reached with a multi-bed cylindrical catalytic converter according to claim 1. Preferred features of said converter are stated in the dependent claims.

Said converter comprises at least:

a first catalytic bed, a second catalytic bed and a heat exchanger arranged between said first bed and said second bed, said heat exchanger being arranged to transfer heat from a first medium to a second medium, wherein the first medium is the hot effluent of the first bed before admission into the second bed, and the second medium is a cooling medium, the converter being characterized in that:

said heat exchanger comprises a plurality of stacked round plates, said plates being full circular plates or annular plates, and adjacent plates define gaps therebetween, and the effluent of the first catalytic bed and the cooling medium pass respectively through alternate gaps between the plates of the heat exchanger.

The effluent of the first catalytic bed is fed to first gaps and the cooling medium is fed to second gaps, said first gaps being alternated with said second gaps.

Preferably, said gaps have a width from 1 to 10 mm, more preferably from 2 to 6 mm.

Preferably, the plate heat exchanger is surrounded by a distributor or collector, e.g. in the form of a wire mesh or a perforated wall. Accordingly, the plate heat exchanger is not in contact with the catalyst loaded in the catalytic beds. This results in the width of the gaps not being dictated by the size of the catalyst and therefore freedom in the plate design.

Preferably, said plates are stamped plates obtained mechanically by means of metal sheet pressing. The metal sheet pressing preferably comprises cold forming on a pressing-tool die with a desired surface corrugation. Preferably, said plates are made of stainless steel, titanium or palladium-stabilized titanium.

The plates can be differently designed to withstand high (dozen bars) or low pressure drops (few bars) between the two sides.

The heat exchanger advantageously comprises means for distributing the hot effluent of the first bed and the cooling medium alternately through said first and second gaps. Adjacent plates are preferably welded one to each other so as to avoid or substantially avoid bypass of the hot effluent into said second gaps together with the cooling medium, and bypass of the cooling medium into said first gaps together with the hot effluent. Preferably, the bypass of the hot effluent into said second gaps and the bypass of the cooling medium into said first gaps are not greater than 1%, more preferably not greater than 0.1%.

According to an embodiment of the invention, said first and second catalytic beds are adiabatic. Accordingly, said catalytic beds comprise no means to directly cool the catalyst (e.g. a heat exchanger immersed in the catalyst), which means the heat produced by the chemical reaction is fully transferred to the gaseous effluent.

According to another embodiment, at least one of said first and second catalytic beds is isothermal, meaning that it comprises a heat exchanger immersed in the catalyst mass to directly remove heat from the catalyst.

According to a particular embodiment, said first bed is isothermal and said second bed is adiabatic.

Preferably, said first catalytic bed is a hollow cylinder comprising a cavity and said heat exchanger is arranged coaxially to the first catalytic bed inside said cavity. Preferably, said heat exchanger is delimited by a cylindrical shell.

Said converter may comprise a plurality of catalytic beds arranged in series and a plurality of inter-bed heat exchangers, wherein said heat exchangers are round plate heat exchangers. Said catalytic beds are preferably hollow cylinders with said heat exchangers being arranged coaxially inside respective cavities of the hollow cylinders. Said catalytic beds may be adiabatic or isothermal.

Preferably said converter comprises no more than five catalytic beds arranged in series, more preferably no more than three catalytic beds, for example two catalytic beds.

The plate heat exchanger comprises two sides, namely a first side traversed by the hot effluent of the first bed before admission into the second bed (i.e. the first medium) and a second side traversed by the cooling medium (i.e. the second medium). Said first side and second side comprise inputs and outputs of the hot effluent and the cooling medium, respectively.

In an embodiment of the invention, said plates are full circular plates.

In another embodiment of the invention, said plates are annular plates. According to this embodiment, the plate heat exchanger preferably comprises a central manifold for collecting the hot effluent (i.e. first medium) or the cooling medium (i.e. first medium) after the heat transfer. Preferably, said central manifold is used to collect the hot effluent after passage through the gaps, namely after cooling. Said central manifold is preferably annular.

According to some embodiments, the effluent of the first catalytic bed and/or the cooling medium traverses the gaps with a radial flow. Preferably, the effluent of the first catalytic bed traverses said gaps with a radial inward flow.

According to other embodiments, the effluent of the first catalytic bed and/or the cooling medium traverses the gaps with a flow which is substantially parallel to a passage-through direction.

According to an embodiment of the invention, at least one of the input and output of at least one of the first medium and second medium includes a plurality of nozzles disposed on a cylindrical shell surrounding the plate heat exchanger.

Preferably, said cylindrical shell comprises a plurality of nozzles for the hot effluent of the first catalytic bed. The effluent of the first catalytic bed is distributed into said first gaps via input nozzles and is collected after passage through said gaps via output nozzles. Preferably, said input nozzle(s) are diametrically opposed to said outlet nozzle(s), so as the effluent traverses the gaps between the plates with a flow which is substantially parallel to a passage-through direction from said input nozzles toward said outlet nozzles.

According to an embodiment, at least one of the input and output of at least one of the first medium and second medium includes a passage made on a top cover or a bottom plate of the heat exchanger, being respectively above or below the stacked heat exchange plates. Preferably, said passage has the shape of a sector of a circle or sector of an annulus, preferably extending over an angle of 60° to 300°, more preferably 90° to 240° and even more preferably 180° or about 180°.

Preferably, one of said top cover and bottom plate has a first passage for distributing the first medium and the other of said top cover and bottom plate has a second passage for collecting said first medium after cooling. Preferably, said first passage and said second passage are diametrically opposed such that said effluent flows through the gaps with a flow substantially parallel to a first direction, which is a passage-through direction, and said effluent enters and leaves the plate heat exchanger with a flow in a second direction which is substantially perpendicular to said first direction.

Preferably, said first passage includes a first set of input nozzles for said first medium, and said second passage includes a second set of output nozzles for collecting said first medium after cooling.

According to an embodiment, the plates comprise a port or a plurality of ports for the input and/or the output of at least one of the first medium and second medium.

In a first embodiment, said plates comprise a plurality of input ports and a plurality of output ports for the passage of the cooling medium through said second gaps. Said output ports are arranged in a more peripheral position than said input ports.

Preferably, said input ports are arranged along an inner rank and said output ports are arranged along an outer rank. Preferably, said inner rank and said outer rank are circular, the inner rank having a first radius and the outer rank having a second radius, the first radius being smaller than the second radius.

Preferably, said input ports are radially aligned with corresponding output ports, meaning that the number of the input ports is preferably the same as the number of the output ports.

As a result of the above described arrangement of said input and output ports, the cooling medium traverses said second gaps with a radial outward flow. Accordingly, when the effluent of the first bed traverses the heat exchanger with a radial inward flow, said first embodiment provides for heat exchange between counter-current fluids.

In a second embodiment, each of said plates comprises a single input port and a single output port for the passage of said cooling medium. Said input and output ports are advantageously diametrically opposed.

As a result, the cooling medium traverses said second gaps with a flow which is substantially parallel to a given direction, i.e. from said inlet port to said output port. When the effluent of the first catalytic bed traverses the first gaps with a flow which is substantially parallel to a given direction, said second embodiment preferably provides for heat exchange between parallel counter-current fluids.

In a particular embodiment, the cylindrical shell surrounding the heat exchanger comprises an inlet opening for feeding the effluent of the first bed into said first gaps, and said heat exchanger comprises a porthole for collecting the effluent of the first catalytic bed after passage through said gaps. Preferably, said collecting porthole is diametrically opposed to said inlet opening; said relative position dictates the flow direction of the effluent gas which is substantially parallel to a given direction from said inlet opening toward said collecting porthole. Preferably, said inlet opening extends over a segment of the cylindrical surface of said cylindrical shell. Said segment has preferably a relatively small width. Said segment preferably extends over an angle comprised in the range 10 to 45°, for example an angle of around 30°.

According to a preferred embodiment, said converter comprises sealing strips arranged to seal a possible by-pass path of the first medium or the second medium around the stacked plates, said sealing strips (24) preferably having a V cross-section.

According to preferred embodiments, the converter of the invention is a converter for the synthesis of ammonia or for the synthesis of methanol.

Another aspect of the present invention relates to a method for revamping a multi-bed catalytic converter comprising at least:
  a first catalytic bed, a second catalytic bed and a heat exchanger arranged between said first bed and said second bed,
  said heat exchanger being arranged to transfer heat from the hot effluent of the first bed before admission into the second bed to a cooling medium, said heat exchanger being a tube bundle heat exchanger, the method being characterized by:

replacing said tube bundle heat exchanger with another heat exchanger comprising a plurality of stacked round plates, wherein adjacent plates define gaps therebetween, and the effluent of the first catalytic bed and the cooling medium are respectively fed into alternate gaps.

In a preferred embodiment, said first catalytic bed is a hollow cylinder comprising a cavity and the heat exchanger is arranged coaxially to the first catalytic bed inside said cavity. Accordingly, the newly installed heat exchanger comprising said plurality of stacked round plates is arranged coaxially to the first catalytic bed inside said cavity.

The converter according to the invention has several advantages.

A major advantage over a conventional tube heat exchanger is that the fluids are exposed to a much larger surface area because the fluids spread out over the plates, thus facilitating the heat transfer.

Furthermore, pressure drops are significantly reduced both on the hot effluent side and in the cooling medium side, compared to a classical shell and tube heat exchanger.

Moreover, the present invention provides for an optimal exploitation of the volume within the converter thanks to the compact design of the round plate-heat exchanger. In particular, in the embodiment comprising hollow catalytic beds, the cylindrical cavities within said beds are exploited at maximum. As a consequence, a greater volume is made available to accommodate catalyst.

Another advantage is an increase of the converter capacity due to the more compact design of the round-plate heat exchanger. Hence, said converter also results in an increase of the ammonia or methanol production.

The advantages of the invention will emerge more clearly from the following detailed description.

DETAILED DESCRIPTION OF A PREFERRED EMBODIMENT

Figure 1:
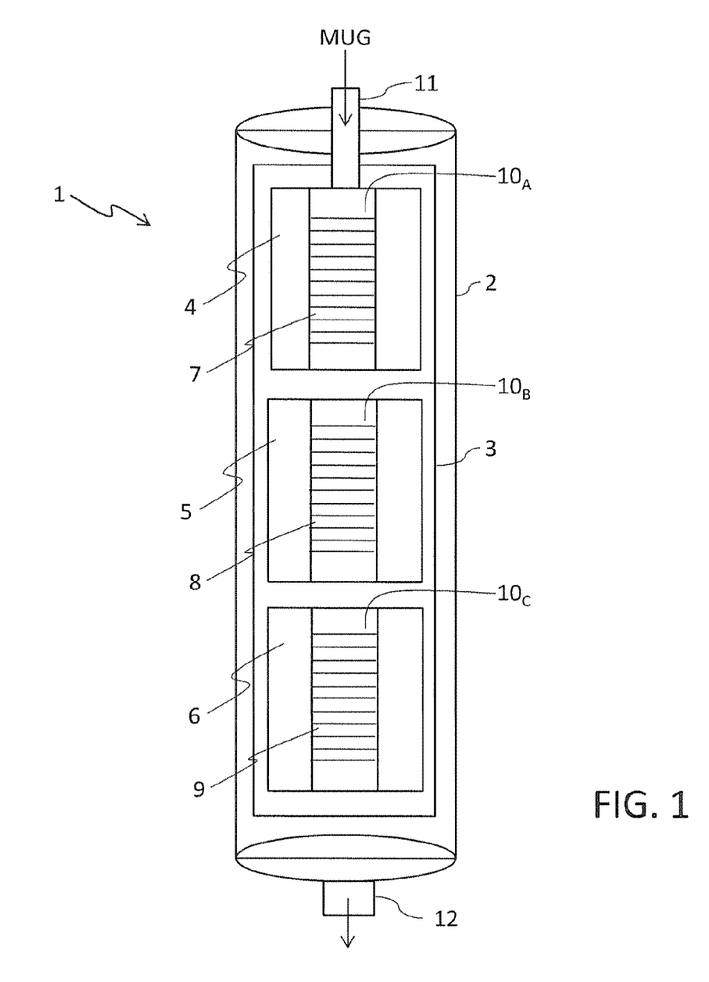
FIG. 1 is a simplified scheme of a multi-bed inter-cooled converter according to the invention.

FIG. 1 illustrates a multi-bed converter 1, for example an ammonia or a methanol converter, including a vessel 2 and a catalytic cartridge 3 comprising three adiabatic catalytic beds 4, 5, 6 arranged in series, two inter-bed plate heat exchangers 7, 8 and, optionally, a bottom heat exchanger 9.

Each bed 4, 5, 6 is traversed by a radial inward or mixed axial-radial flow and has an annular cylindrical shape with a central axial cavity $10_A$, $10_B$, $10_C$. The plate heat exchangers 7, 8, 9 are arranged, respectively, in said central cavities $10_A$, $10_B$, $10_C$ to provide inter-bed cooling of the gaseous products evolving from one catalytic bed to another.

A fresh make-up gas (MUG) is fed to the converter 1 through the gas inlet 11 and enters the first bed 4; the effluent of the first bed 4 is cooled while flowing through the plates of the first inter-bed exchanger 7; the cooled effluent enters the second bed 5. Similarly, the effluent of the second bed 5 is cooled in the second inter-bed heat exchanger 8 before entering the third bed 6, and the effluent of the third bed 6 is cooled in the bottom heat exchanger 9 before leaving the converter 1 via the outlet 12.

According to the example of FIG. 1, the catalytic beds 4, 5, 6 are adiabatic since they contain no cooling means. In other embodiments, one or more of said catalytic beds 4, 5, 6 may be isothermal, i.e. contain heat exchange bodies (e.g. tubes or plates) immersed therein.

Figures 2, 3:
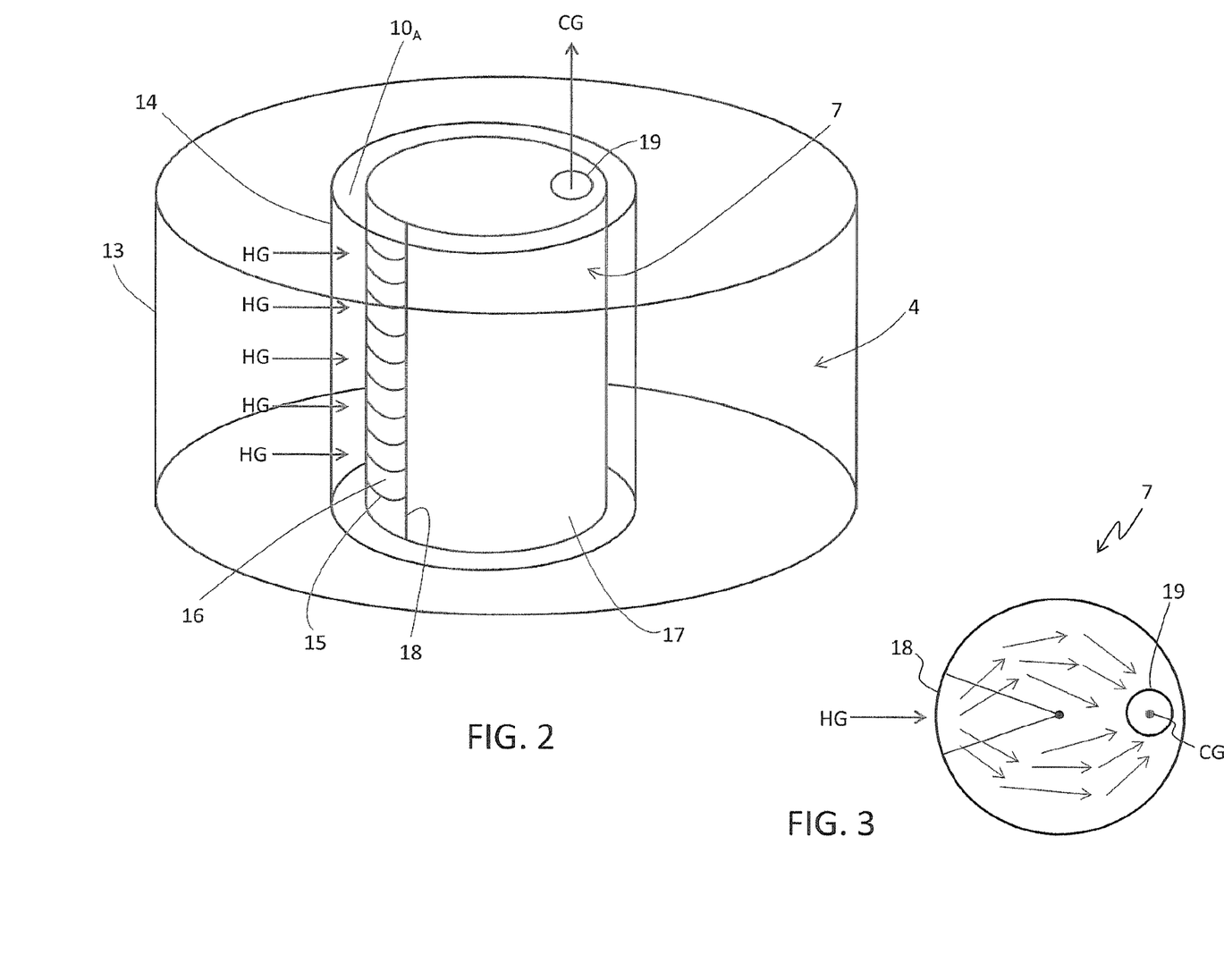
FIG. 2 shows the first catalytic bed and the first inter-bed cooler of the converter of FIG. 1 according to an embodiment of the invention.
FIG. 3 shows a top view of the inter-bed cooler of FIG. 2.

FIG. 2 illustrates in greater detail the first catalytic bed 4 and the first inter-bed plate heat exchanger 7 of the converter 1 of FIG. 1, according to an embodiment of the invention.

Said catalytic bed 4 is delimited by a gas distributor 13 and a gas collector 14, which are represented by an outer cylindrical wall and an inner cylindrical wall, respectively. Said outer and inner cylindrical walls are permeable to gas and able to retain the catalyst, comprising e.g. slots of a suitable size.

Said gas collector 14 internally defines the above mentioned central cavity $10_A$, which accommodates said first plate heat exchanger 7.

As shown in FIG. 2, said heat exchanger 7 comprises a plurality of stacked full circular plates 15. Adjacent plates define gaps 16 therebetween for the passage of the hot gas HG leaving the first catalytic bed 4 and for the passage of a cooling medium (not shown in FIG. 2). In particular, adjacent plates 15 are welded in such a way to allow the passage of the hot gas HG through first gaps 16 and the passage of the cooling medium through second gaps 16, said first and second gaps being alternated.

The plate heat exchanger 7 has a cylindrical shell 17, which comprises an opening 18 for feeding the hot gas HG into the heat exchanger. Said opening 18 extends over a segment of the cylindrical surface of said cylindrical shell 17. According to the example shown in FIG. 3, said segment extends over an angle α of 30°.

The plate heat exchanger 7 also comprises a porthole 19 for collecting the cooled gas CG after passage through the respective gaps 16 (i.e. the above referred first gaps) between the plates. Said porthole 19 is advantageously opposite to the opening 18.

As a result of the relative position of the inlet opening 18 and the collecting porthole 19 of FIGS. 2 and 3, the flow of the hot gas HG through said first gaps is essentially directed along a diametral direction from the inlet opening 18 toward the collecting porthole 19.

In greater detail, after traversing the gas collector 14, the hot gas HG spreads into the central cavity $10_A$ and enters the plate heat exchanger 7 through the inlet port 18. The hot gas HG is supplied to alternate gaps between the plates 15 and the resulting cooled gas CG then converges into the porthole 19, from which it is directed to the subsequent catalytic bed.

Figure 4:
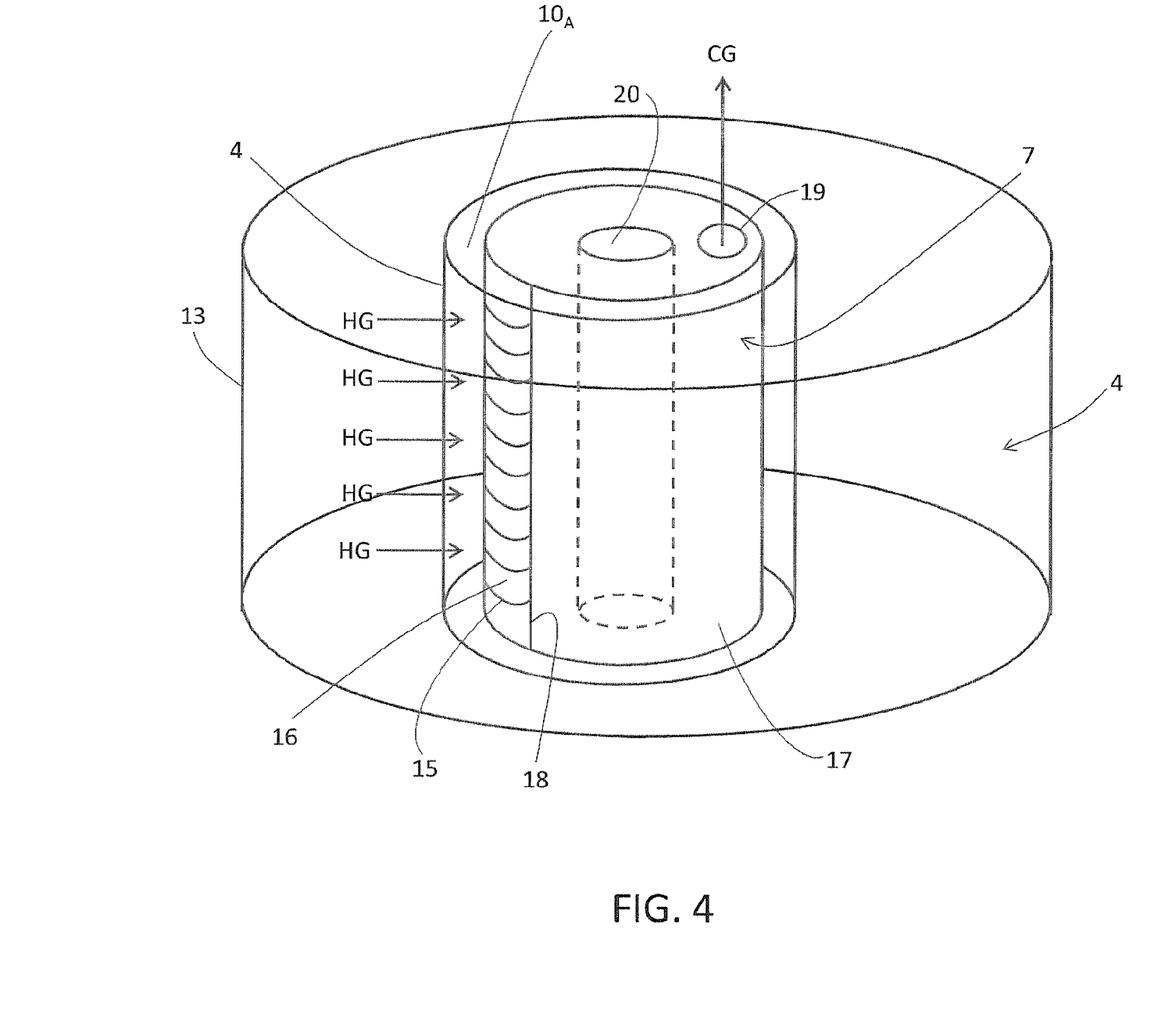
FIG. 4 shows a variant of FIG. 2.

The embodiment shown in FIG. 4 is preferred when a pipe 20 must be accommodated inside the central cavity $10_A$. Accordingly, the plates 15 are annular.

Figure 5:
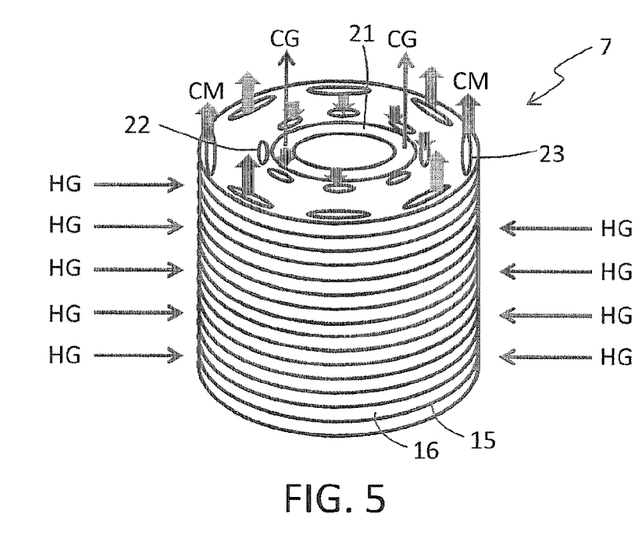
FIG. 5 shows a plate heat exchanger with a radial flow configuration according to a further embodiment of the invention.

FIG. 5 illustrates an embodiment of a plate heat exchanger 7 traversed by a radial flow of the hot gaseous effluent HG.

According to this embodiment, the plate heat exchanger 7 comprises stacked annular plates 15 and a central annular manifold 21 for collecting the cooled gas CG after passage through respective gaps 16. The hot gas HG is fed to the heat exchanger 7 along the entire peripheral surface of the heat exchanger 7 and is collected into the central manifold 21, thus generating a radial inward flow.

The plates 15 comprise a plurality of input ports 22 and a plurality of output ports 23 for the passage of a cooling medium CM. Said input ports 22 are arranged along a first circular rank having a first radius and said output ports 23 are arranged along a second circular rank having a second radius, wherein said first radius is smaller than said second radius. Preferably, said input ports 22 are radially aligned with corresponding outputs ports 23.

As a result of the above described position of said input and output ports 22, 23, the cooling medium CM traverses alternate gaps 16 with a radial outward flow, thus resulting in counter-current with respect to the hot gas HG.

Figure 6:
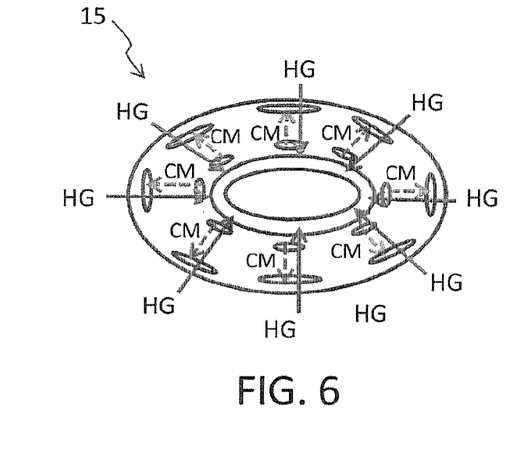
FIG. 6 shows the counter-current flow of the fluids circulating between the plates of the heat exchanger of FIG. 5.

Accordingly, the embodiment of FIG. 5 provides for a heat exchange between fluids in counter-current, as further shown in FIG. 6.

Figure 7:
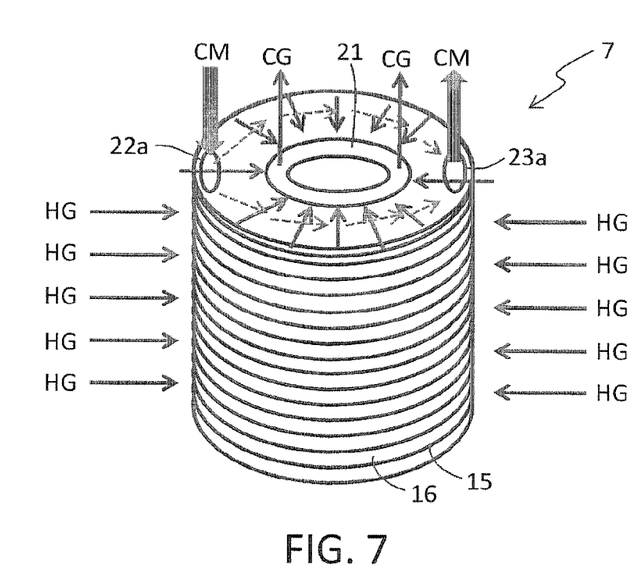
FIG. 7 shows an alternative to the plate heat exchanger of FIG. 5.

FIG. 7 shows a variant of the plate heat exchanger 7, wherein the plates 15 comprise one input port 22a and one output port 23b for the passage of the cooling medium CM. Said ports 22a and 23a are diametrically opposed. As a result, the cooling medium CM traverses alternate gaps 16 between the plates 15 with a flow which is substantially parallel to a given direction, i.e. from the input port 22a to the output port 23a, as can be seen in FIG. 7 (dotted arrows). The hot gas HG has a radial inward flow, similarly to the embodiment of FIGS. 5, 6.

Figure 8:
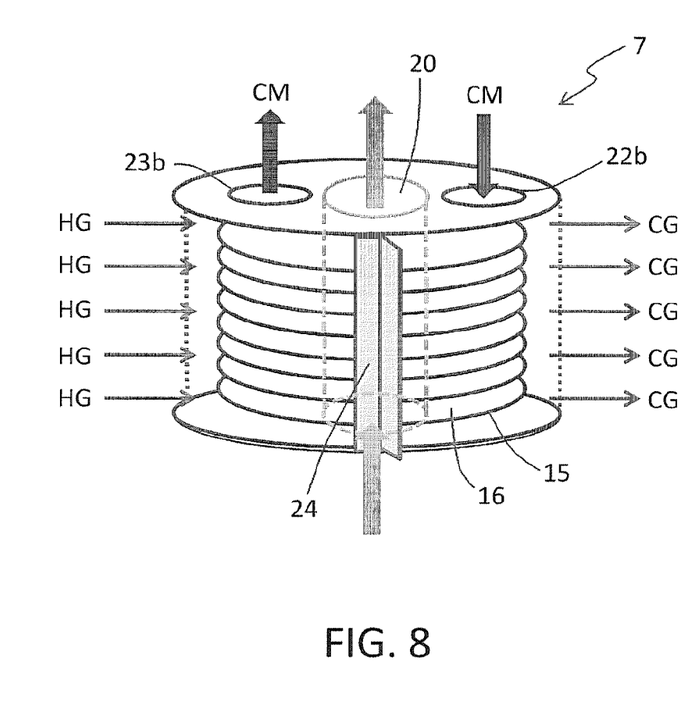
FIG. 8 shows a variant of FIG. 7.

FIG. 8 shows a variant of FIG. 7, wherein the hot gas HG and the cooling medium CM traverse alternate gaps 16 between the plates 15 with a counter-current parallel flow.

The cooling medium CM is fed to the plate heat exchanger 7 through the input port 22b and leaves the exchanger 7 through the output port 23b. In another embodiment (not shown), the cooling medium CM enters and leaves the exchanger 7 through one or more input nozzle(s) and one or more outlet nozzle(s), respectively.

The hot gas HG is fed to the plate heat exchanger 7 through a first set of shell nozzles (input nozzles) disposed on the cylindrical shell 17 (see FIG. 2). Preferably said input nozzles are diametrically opposite to the input port 22b.

The cooled gas CG leaves the exchanger 7 through a second set of nozzles (output nozzles) of the shell 17. Preferably said output nozzles are diametrically opposite to the output port 23b. The embodiment of FIG. 8 also comprises sealing strips 24 for sealing a possible by-pass path of the hot gas HG around the plates. It can be appreciated that the embodiment of FIG. 8, and variants thereof, provides a counter-current parallel flow pattern of hot gas and cooling medium.

The central cavity of the annular plates 15 houses a pipe 20 traversed by a further medium (third medium) which is not involved in the heat exchange process of said plate heat exchanger 7.

The configuration of the plate heat exchanger 7 illustrated in FIG. 8 allows a better arrangement of the heat exchanger inside the converter.

Figure 9:
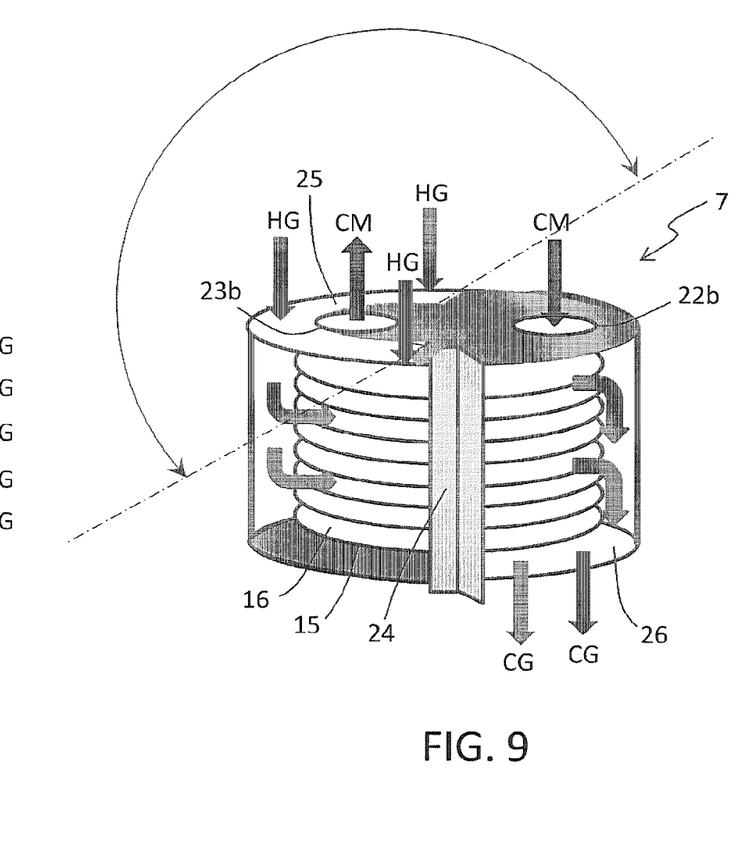
FIG. 9 shows a variant of FIG. 8.

FIG. 9 is a variant of FIG. 8, wherein the hot gas HG enters and exits the plate heat exchanger 7 via respective input nozzles and output nozzles (not shown) with a flow which is substantially perpendicular to the flow of the hot gas HG into the gaps 16. This arrangement allows a more compact design of the plate heat exchanger 7. Said input nozzles are distributed over an input area 25 of a top cover of the heat exchanger 7. Said output nozzles are distributed over an output area 26 of a bottom cover. Preferably said input area 25 and said output area 26 have an angular opening of 180° or around 180°.

The invention claimed is:

1. A multi-bed cylindrical catalytic converter, comprising:
a first catalytic bed;
a second catalytic bed;
a heat exchanger arranged between said first catalytic bed and said second catalytic bed, said heat exchanger being arranged to transfer heat from a first medium to a second medium;
an input and an output for the first medium; and
an input and an output for the second medium;
wherein the first medium is the hot effluent of the first catalytic bed before admission into the second catalytic bed, and the second medium is a cooling medium;
wherein said heat exchanger comprises a plurality of stacked round plates, said plurality of stacked round plates being full circular plates or annular plates, and adjacent plates of the plurality of stacked round plates define gaps therebetween;
wherein the hot effluent of the first catalytic bed and the cooling medium pass respectively through alternating ones of the gaps between the plurality of stacked round plates;
wherein said first catalytic bed is a hollow cylinder comprising a cavity and said heat exchanger is arranged coaxially to the first catalytic bed inside said cavity.

2. The multi-bed cylindrical catalytic converter according to claim 1, wherein said plurality of stacked round plates are stamped plates obtained mechanically by metal sheet pressing.

3. The multi-bed cylindrical catalytic converter according to claim 1, wherein at least one of the input or the output of at least one of the first medium or the second medium includes a plurality of nozzles disposed on a cylindrical shell around the plurality of stacked round plates of the heat exchanger.

4. The multi-bed cylindrical catalytic converter according to claim 3, wherein said cylindrical shell comprises a first plurality of input nozzles for distributing the first medium and a second plurality of output nozzles for collecting the first medium after cooling.

5. The multi-bed cylindrical catalytic converter according to claim 4, wherein said first plurality of input nozzles and said second plurality of output nozzles being diametrically opposed, so that said first medium traverses the gaps between the plurality of stacked round plates with a flow that is substantially parallel to a passage-through direction from said first plurality of input nozzles toward said second plurality of output nozzles.

6. The multi-bed cylindrical catalytic converter according to claim 1, wherein at least one of the input or the output of at least one of the first medium or the second medium includes a passage made on a top cover or a bottom plate of the heat exchanger, being respectively above or below the plurality of stacked round plates.

7. The multi-bed cylindrical catalytic converter according to claim 6, wherein said passage has a shape of a sector of a circle or sector of an annulus extending over an angle of 60° to 300°.

8. The multi-bed cylindrical catalytic converter according to claim 6, wherein one of the top cover or the bottom plate has a first passage for distributing the first medium and the other one of said top cover or said bottom plate has a second passage for collecting the first medium after cooling.

9. The multi-bed cylindrical catalytic converter according to claim 8, wherein said first passage and said second passage are diametrically opposed such that:
the first medium flows through said gaps with a flow substantially parallel to a first direction, which is a passage-through direction; and
said first medium enters and leaves the heat exchanger with a flow in a second direction that is substantially perpendicular to said first direction.

10. The multi-bed cylindrical catalytic converter according to claim 8, wherein said first passage includes a first set of input nozzles for said first medium, and said second passage includes a second set of output nozzles for collecting said first medium after cooling.

11. The multi-bed cylindrical catalytic converter according to claim 1, wherein said plurality of stacked round plates comprise a port or a plurality of ports for the input and/or the output of at least one of the first medium or the second medium.

12. The multi-bed cylindrical catalytic converter according to claim 11, wherein said plurality of stacked round plates comprise one input port and one output port for the cooling medium, said input port and said output port being diametrically opposed to each other.

13. The multi-bed cylindrical catalytic converter according to claim 11, wherein said plurality of stacked round plates comprise a plurality of input ports and a plurality of output ports for the cooling medium, said plurality of output ports being arranged in a more peripheral position than said plurality of input ports.

14. The multi-bed cylindrical catalytic converter according to claim 13, wherein:
said plurality of input ports are arranged along an inner rank and said plurality of output ports are arranged along an outer rank; and
said inner rank and outer rank are circular, the inner rank having a first radius and the outer rank having a second radius, the first radius being smaller than the second radius.

15. The multi-bed cylindrical catalytic converter according to claim 13, wherein said plurality of input ports are radially aligned with corresponding outputs ports of the plurality of output ports.

16. The multi-bed cylindrical catalytic converter according to claim 11, wherein:
said heat exchanger is delimited by a cylindrical shell comprising an inlet opening for said first medium, said inlet opening extending over a segment of the cylindrical surface of said cylindrical shell, said segment extending over an angle from 10 to 45°;
said heat exchanger comprises a collecting port for collecting said effluent after cooling; and
said inlet opening and said collecting port being diametrically opposed, so that said first medium traverses the gaps between the plurality of stacked round plates with a flow that is substantially parallel to a given direction from said inlet opening toward said collecting port.

17. The multi-bed cylindrical catalytic converter according to claim 1, further comprising sealing strips arranged to seal a possible by-pass path of the first medium or the second medium around the plurality of stacked round plates, said sealing strips having a V cross-section.

18. The multi-bed cylindrical catalytic converter according to claim 1, wherein said plurality of stacked round plates are annular and said heat exchanger comprises a central manifold for collecting one of said first medium or said second medium after the heat transfer, for collecting the first medium after cooling, said central manifold being annular.

19. The multi-bed cylindrical catalytic converter according to claim 1, wherein at least one of the first medium or the second medium traverses the heat exchanger with a radial flow.

20. The multi-bed cylindrical catalytic converter according to claim 1, wherein said heat exchanger comprises weldings between the plurality of stacked round plates arranged to respectively feed the effluent of the first catalytic bed and the cooling medium into alternating ones of the gaps.

21. The multi-bed cylindrical catalytic converter according to claim 1, configured for the synthesis of ammonia or methanol.

22. The multi-bed cylindrical catalytic converter according to claim 1, wherein said gaps have a width from 1 mm to 10 mm.

23. The multi-bed cylindrical catalytic converter according to claim 22, wherein said width is from 2 mm to 6 mm.

24. A method for revamping a multi-bed catalytic converter, wherein the multi-bed catalytic converter includes: a first catalytic bed, a second catalytic bed, and a heat exchanger arranged between said first bed and said second bed; said heat exchanger being arranged to transfer heat from the hot effluent of the first catalytic bed before admission into the second catalytic bed to a cooling medium; said heat exchanger being a tube bundle heat exchanger;
the method comprising:
replacing said tube bundle heat exchanger with another heat exchanger comprising a plurality of stacked round plates, wherein adjacent plates of the plurality of stacked round plates define gaps therebetween, and the effluent of the first catalytic bed and the cooling medium are respectively fed into alternating ones of the gaps;
wherein said first catalytic bed is a hollow cylinder comprising a cavity and said new heat exchanger with stacked round plates is arranged coaxially to the first catalytic bed inside said cavity.

* * * * *